(12) United States Patent
Padala et al.

(10) Patent No.: US 8,473,508 B2
(45) Date of Patent: Jun. 25, 2013

(54) DYNAMIC RULE CREATION AND CACHING

(75) Inventors: Appla Jagadesh Padala, Irving, TX (US); Shalabh Gupta, Ladera Ranch, CA (US)

(73) Assignee: Oracle International Corporation, Redwood Shores, CA (US)

( * ) Notice: Subject to any disclaimer, the term of this patent is extended or adjusted under 35 U.S.C. 154(b) by 476 days.

(21) Appl. No.: 12/572,044

(22) Filed: Oct. 1, 2009

(65) Prior Publication Data

US 2011/0082845 A1  Apr. 7, 2011

(51) Int. Cl.
*G06F 17/30* (2006.01)

(52) U.S. Cl.
USPC ............... 707/769; 711/118; 715/221

(58) Field of Classification Search
USPC .................................. 711/100–123
See application file for complete search history.

(56) References Cited

U.S. PATENT DOCUMENTS

| | | | | |
|---|---|---|---|---|
| 6,629,098 B2* | 9/2003 | Mc George, Jr. | .................. | 1/1 |
| 6,868,413 B1* | 3/2005 | Grindrod et al. | .................. | 706/59 |
| 7,913,159 B2* | 3/2011 | Larcheveque et al. | ........ | 715/224 |
| 2003/0229525 A1 | 12/2003 | Callahan et al. | | |
| 2004/0019500 A1 | 1/2004 | Ruth | | |
| 2005/0197952 A1 | 9/2005 | Shea et al. | | |
| 2006/0047561 A1 | 3/2006 | Bolton | | |
| 2008/0103857 A1 | 5/2008 | Yankovich et al. | | |
| 2008/0104092 A1* | 5/2008 | Cummins | .................. | 707/101 |
| 2009/0171903 A1* | 7/2009 | Lin et al. | .................. | 707/3 |
| 2009/0287617 A1* | 11/2009 | Schmidt | .................. | 706/10 |
| 2009/0319881 A1* | 12/2009 | Chokshi | .................. | 715/221 |
| 2010/0185963 A1* | 7/2010 | Slik et al. | .................. | 715/764 |

OTHER PUBLICATIONS

Trustwave GRC; obtained at https://www.trustwave.com/GRC.php.
IT Compliance With CA Governance, Risk & Compliance Manager, obtained at http://ca.com/files/ProductBriefs/it_grc_product_brief.pdf.
Visual GRC; obtained at http://www.jotatech.com/visual_grc_platform.
Accord for GRC; obtained at http://www.categoric.com/products/accord-for-governance-risk-and-compliance/accord-for-grc--governance-risk-and-compliance.html.

(Continued)

*Primary Examiner* — Fred I Ehichioya
*Assistant Examiner* — Michelle Owyang
(74) *Attorney, Agent, or Firm* — Trellis IP Law Group, PC

(57) ABSTRACT

A condensed version of a plurality of rules for one or more forms being used by a user is loaded from a database. The condensed version of the plurality of rules is stored in cache memory of a computing device. When an event occurs, a rules engine determines if a condensed version of the rule is stored in cache memory. If a rule is not applicable, the rules engine does not query the database. If a rule is applicable, the rules engine determines if an action should be taken for the event. If no action is to be taken, the database is not queried for the rule. If an action is to be taken, the database may be queried for information for the rule to allow performing of the action or if the action is included in the condensed version, the action is performed without querying the database.

10 Claims, 9 Drawing Sheets

OTHER PUBLICATIONS

Governance, Risk Management, Compliance (GRC); obtained at http://www.interfacing.com/Compliance SOX-ISO-BASEL-Six-Sigma-Risk/grc-governance-risk-compliance.

Establishing information security as a business enabler—How IBM helps deliver a secure infrastructure for e-business; obtained at http://som.csudh.edu/depts/cis/msheu/CIS%20502/week08/est_info_sec.pdf.

Improving security to enhance the business impact of your Siebel eBusiness Applications; obtained at ftp://ftp.software.ibm.com/software/tivoli/whitepapers/access-siebel.pdf.

Compliance Risk Management—AMD white paper; obtained at http://enterprise.amd.com/Downloads/Industry/Financial/43426A_WP_CompRiskMgt.pdf.

* cited by examiner

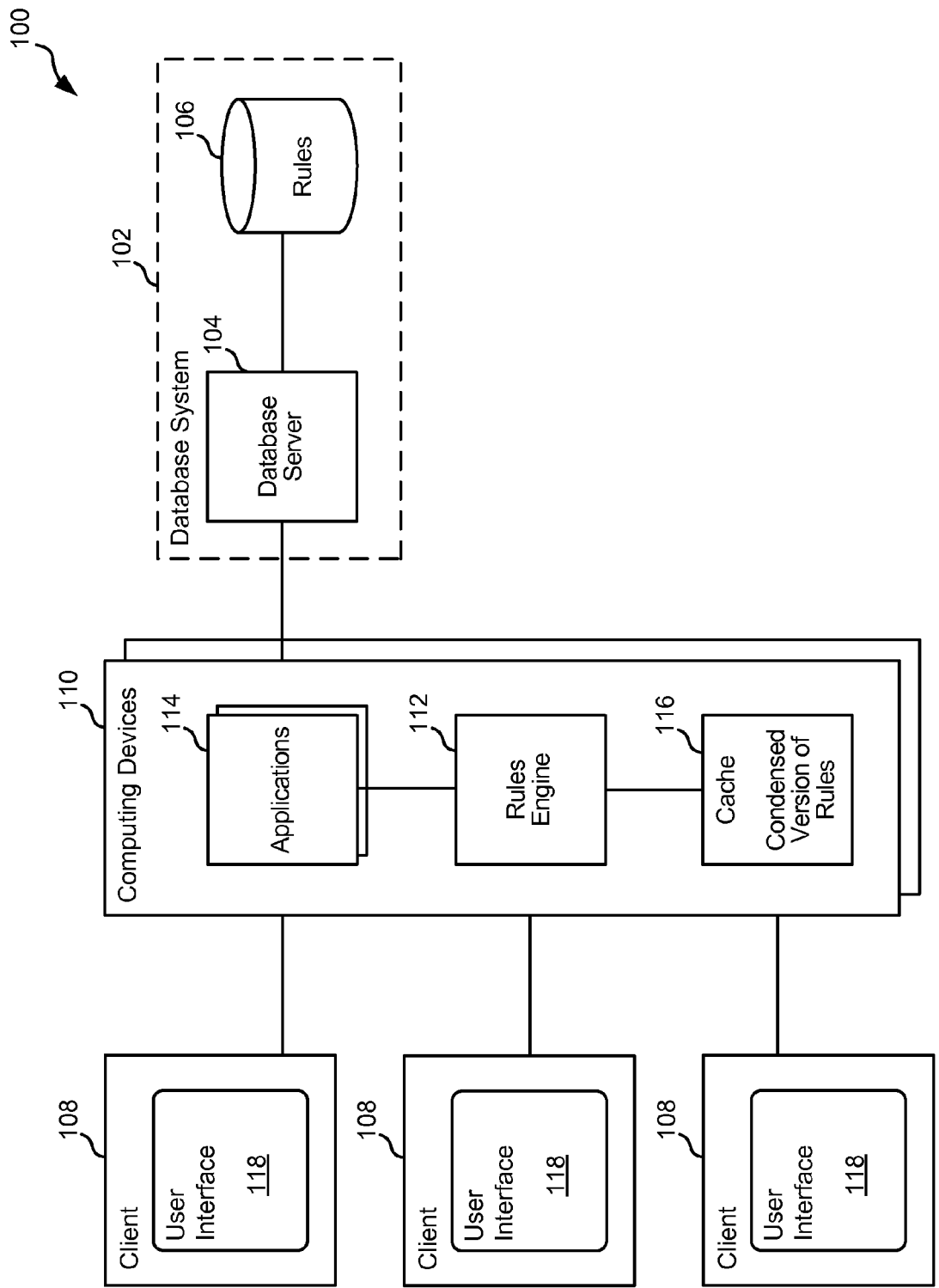

DYNAMIC RULE CREATION AND CACHING

BACKGROUND

Particular embodiments generally relate to rules processing in an application.

A business application product may be used to display and create security rules for a form without writing software code. To activate the rules after they are created, a user has to navigate to a control screen that is different from a screen used to create the rule. When many rules are being created or a presentation is being performed, the navigating to another screen may be burdensome.

Also, once the rules are created, they are stored in a database. The rules are then accessed and retrieved when events occur while a user is using the form. For example, when an event occurs, the database is queried for an applicable rule for the event. The number of events that may occur when an enterprise-wide application is being used may be in the thousands and millions. This requires a lot of database queries that may use a lot of computing resources.

SUMMARY

Particular embodiments generally relate to providing caching of rules and immediate activation of newly-created rules. In one embodiment, a condensed version of a plurality of rules for one or more forms being used by a user is loaded from a database. The condensed version of the plurality of rules is stored in cache memory of a computing device. When an event occurs while a user is using the one or more forms, a rules engine determines if a condensed version of the rule is stored in cache memory. If a rule is not applicable, the rules engine does not query the database. If a rule is applicable, the rules engine determines if an action should be taken for the event. If no action is to be taken, the database is not queried for the rule. If an action is to be taken, the database may be queried for information for the rule to allow performing of the action or if the action is included in the condensed version, the action is performed without querying the database. Accordingly, by caching a condensed version of rules in cache memory, queries to the database are avoided if rules are not applicable for events, actions have been included in the condensed version, or actions for events do not need to be taken. This may eliminate unnecessary queries to the database.

In another embodiment, automatic activation of created rules is provided. A user may create a rule on a form and have it activated without having to navigate to another form. A routine may be called that stores the created rule such that it is automatically activated.

In one embodiment, a method is provided comprising: loading a condensed version of a plurality of rules from a database for one or more forms being used by a user; storing the condensed version of the plurality of rules in cache memory of a computing device; determining when an event occurs while the user is using the one or more forms; determining, by a computer processor, if a rule is applicable for the event based on if a condensed version of the rule is stored in the cache memory of the computing device for the event; if a rule is not applicable, not querying the database for information for the rule; and if a rule is applicable, performing, by the computer processor, an action for the rule.

In another embodiment, a computer-readable storage medium is provided comprising encoded logic for execution by the one or more computer processors. The logic when executed is operable to: load a condensed version of a plurality of rules from a database for one or more forms being used by a user; store the condensed version of the plurality of rules in cache memory of a computing device; determine when an event occurs while the user is using the one or more forms; determine if a rule is applicable for the event based on if a condensed version of the rule is stored in the cache memory of the computing device for the event; if a rule is not applicable, not query the database for information for the rule; and if a rule is applicable, perform an action for the rule.

In another embodiment, an apparatus is provided comprising: one or more computer processors; and logic encoded in one or more computer readable storage media for execution by the one or more computer processors. The logic when executed operable to: load a condensed version of a plurality of rules from a database for one or more forms being used by a user; store the condensed version of the plurality of rules in cache memory of a computing device; determine when an event occurs while the user is using the one or more forms; determine if a rule is applicable for the event based on if a condensed version of the rule is stored in the cache memory of the computing device for the event; if a rule is not applicable, not query the database for information for the rule; and if a rule is applicable, perform an action for the rule.

A further understanding of the nature and the advantages of particular embodiments disclosed herein may be realized by reference of the remaining portions of the specification and the attached drawings.

BRIEF DESCRIPTION OF THE DRAWINGS

FIG. 1 depicts a simplified system for performing rules caching and automatic activation of rules according to one embodiment.

DETAILED DESCRIPTION OF EMBODIMENTS

Figure 2A:
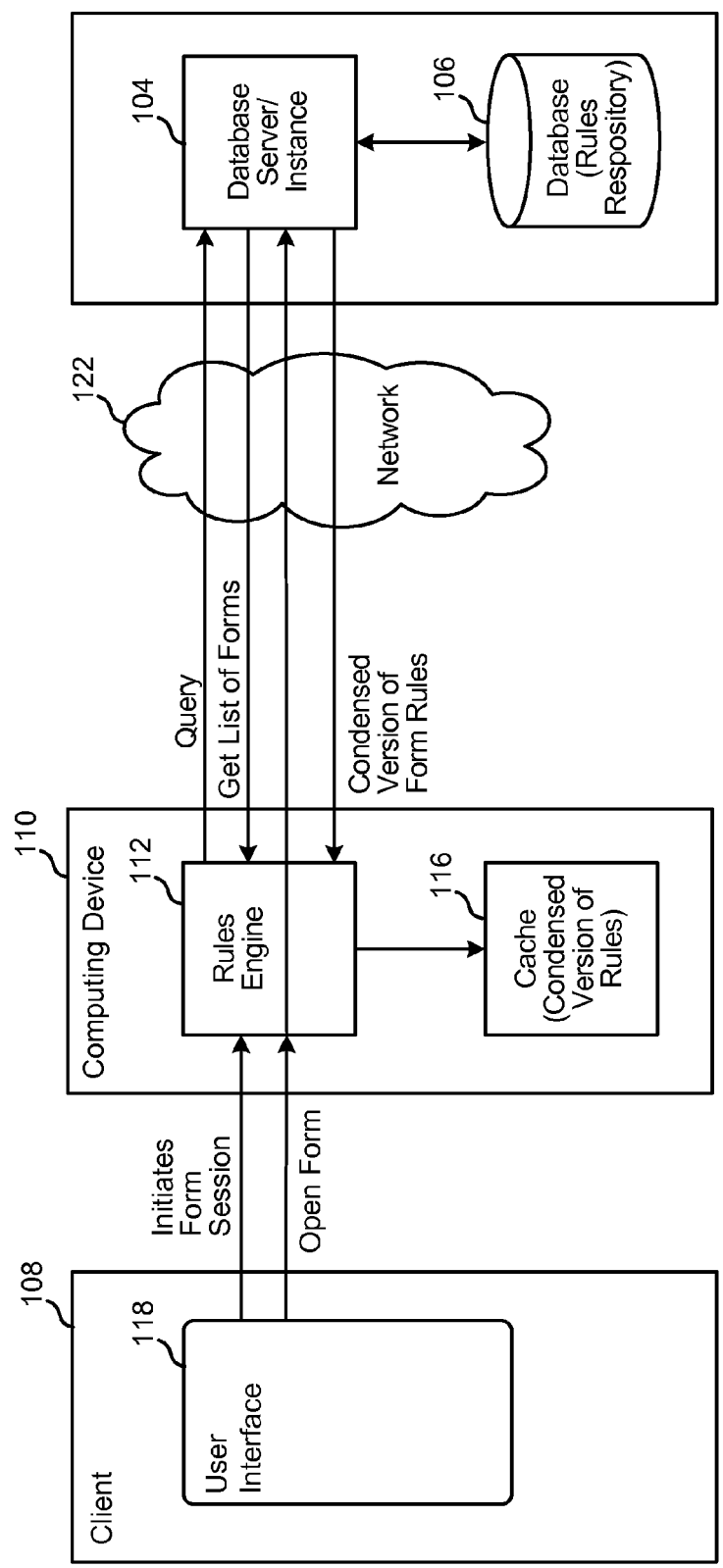
FIG. 2A depicts an example of storing the condensed version of the rules according to one embodiment.

FIG. 1 depicts a simplified system 100 for performing rules caching and automatic activation of rules according to one embodiment. Rules may be provided in a database system 102, which may include a database server 104 and a database 106. The rules may be stored in database 106 and accessed through database server 104. It will be understood that database may refer to any part of database system 102.

The rules are used to determine actions to perform for forms that are being used by a user. The forms may be part of an e-business product suite that is used for governance, risk, and compliance (GRC). Governance focuses on creating organizational transparency by defining the mechanisms an organization uses to ensure that its constituents follow established processes and policies. A governance strategy implements systems to monitor and record current business activity, takes steps to ensure compliance with agreed policies, and provides for corrective action in cases where the rules have been ignored or misconstrued. Risk Management may be the process by which an organization sets the risk tolerance, identifies potential risks and prioritizes the tolerance for risk based on the organization's business objectives. Risk Management leverages internal controls to manage and mitigate risk throughout the organization. Compliance may be the process that records and monitors the controls, be they physical, logical or organizational, needed to enable compliance with legislative or industry mandates as well as internal policies. Although the e-business product suite is described, it will be understood that other applications may use the functions described.

A plurality of clients 108 may access one or more computing devices 110 that are running the applications 114 for the e-business product suite. Client devices 108 may be computing devices, such as a personal computer, workstation, or any other device that can access the forms. Clients 108 include a user interface 118 to display the forms. A user can interact with the forms in various ways, such as by clicking on fields or performing any other actions with the forms.

Computing devices 110 may be centralized servers that are running applications 114. In other embodiments, it will be understood that client devices 108 may be running the application locally and functions discussed with respect to computing devices 110 may be performed by client devices 108. Also, it will be understood that functions described for computing device 110 may be distributed among different devices in addition to those being provided by clients 108.

The forms may be any interfaces for application 114 that are used in GRC in one embodiment. Particular embodiments provide rules caching and automatic rule creation. Rules caching loads a condensed version of the rules into cache 116 from database 106. When events occur on a form, cache 116 is checked to see if a condensed version of the rule exists for the event. If a rule does not exist or does not apply to the event, then a query to database 106 is not necessary. If a rule applies to the event, the condensed version of the rule may specify an action to perform. In some cases, the action may not be encoded in the condensed version and database 106 may be queried for details of the rule. Thus, if a rule does not apply for the event, unnecessary queries to database 106 are avoided. Also, actions may be encoded in the condensed version, which eliminate queries to database 106.

In automatic rule creation, the rules may be created using a rules form without changing any of the core code of the product suite. A user does not need to write code to add or change a rule. Rather, a graphical user interface is used to create the rules. The rules that can be created include security features such as masking or not displaying sections of a form, changes to lists of values on drop-down lists, and additional validation on certain e-business application forms. Rules that are created are automatically activated without requiring a user to navigate to another screen.

The following will describe rules caching first and then automatic rule activation.

Rules Caching

Rules engine 112 is configured to interact with application 114 to provide rules processing. Rules engine 112 accesses rules stored in database 106 and stores a condensed version in cache 116. Cache 116 may be memory that is smaller and faster to access than database 106. For example, cache 116 may be included in computing device 110 and accessed by rules engine 112 without performing any database queries using database server 104. This allows for quicker retrieval of information in addition to using less network resources that are required to communicate with database server 104 and query database 106.

FIG. 2A depicts an example of storing the condensed version of the rules according to one embodiment. Client 108 through user interface 118 may initiate a session. For example, application 114 may be initiated and a session where interaction with forms is started. Rules engine 112 then queries database server 104 for a list of forms that have rules associated with them. Database server 104 responds with a list of forms, such as a list of short names for forms that identify forms that have rules enabled and stores it in cache 116.

While using application 114, a user may open a form. User interface 118 sends a message indicating that a form has been opened. Rules engine 112 checks the cache 116 to determine if rules exist on the form. If rules exist on the form then it makes a request to database server 104. Database server 104 returns the condensed version of rules for that form to rules engine 112, which can then cache the condensed version of the rules.

The condensed version of the rules is a shortened version of the rules stored in database 106. For example, in one embodiment, a rule may conceptually be of multiple parts. A condition part may be an if-or-else statement and a second part may be an action statement. The if-or-else statement may be a condition that, when evaluated to true, a corresponding action is performed. The condensed version may be an encoded version of the rule. The encoded version may be a shortened version of what is stored in database 106. Some rules may be simple enough where the condition and action can be encoded into a condensed version. For example, hiding a field may be a rule wherein the condition and action can be encoded into the condensed version. Also, because cache memory is a limited amount of memory, not all rules may be encoded with the condition and action part of the rule. However, some rules may be more complicated and cannot be fully encoded into the condensed version. For example, the full form of the rule may be stored in multiple tables in database 106 (e.g., 10-35 tables) and cannot be condensed. Also, because cache memory is a limited amount of memory, not all rules may be encoded with the condition and action part of the rule. For all the rules for the form, the condensed version may include the condition part of the rule. That is, data for the condition part may be retrieved and encoded in cache 116. The condition part is used to determine if an action needs to be taken when events occur. In some cases, the action is also encoded. In one embodiment, actions that can be performed using information encoded without the need to access other information in the database can be encoded. For example, actions that do not involve Structured Query Language (SQL) query, some text messages, workflow, block of Procedural Language/Structured Query Language (PLSQL) code are encoded. For example, security rules, navigation rules and field attribute rules are encoded.

The condensed version of the rules may be associated with different items on a form. When an event occurs for an item, it is determined if there is an applicable rule in cache 116. If not, then a query to database 106 does not need to be performed. If there is an applicable rule, the applicable rule is tested against the event to see if an action should be taken. If the action is encoded with the condensed version, then the action can be performed without making a query to database 106. If the action is not encoded, then database 106 is queried.

Figure 2B:
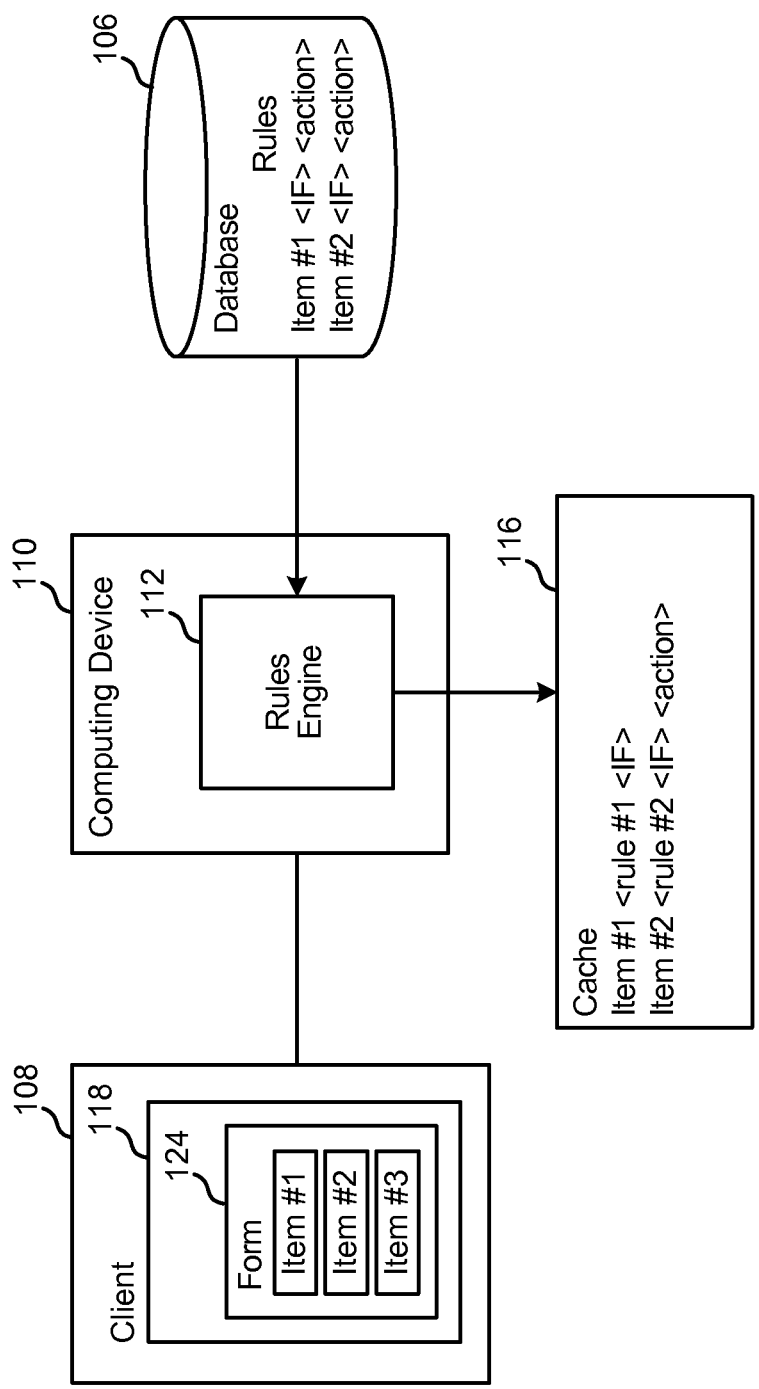
FIG. 2B shows an example of processing events according to one embodiment.

FIG. 2B shows an example of processing events according to one embodiment. When an event occurs, cache 116 is accessed to determine if there is a rule associated with the event. For example, an event may be associated with an item for the form. Rules for the item may be retrieved from cache 116. Examples of events include an opening of a screen, tabbing to a new field, or saving a record that is classified. A condensed version of the rule (rule #1 <If> or rule #2 <If> <action>) is stored. For rule #1, the conditional part has been stored and for rule #2, the conditional and action part has been stored. In one embodiment, each rule has been associated with an item from a form 124 shown in user interface 118. An item may be a field or entry box of form 124. Rules engine 112 may determine if a rule exists for the event and also may determine if an action needs to be performed.

Figure 2C:
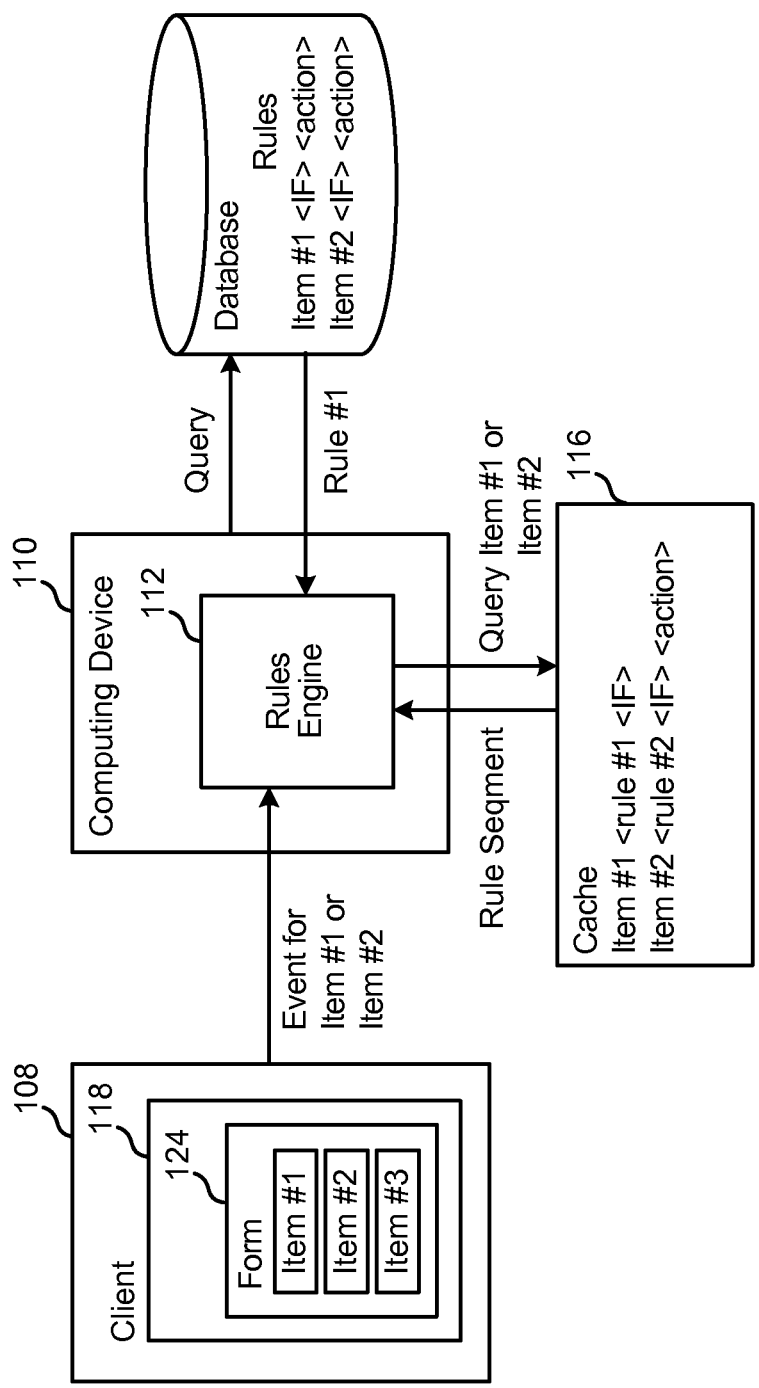
FIG. 2C shows actions taken when an item is selected according to one embodiment.

FIG. 2C shows actions taken when an item is selected according to one embodiment. If an event occurs for items #1 or #2, rules engine 112 checks if a rule is applicable for the item. In this case, rules engine 112 determines that a rule exists for these items because a condensed version is found in cache 116. Rules engine 112 can also evaluate when an action needs to be performed. For example, the <If> part of the rule segment is evaluated against the event received to determine if an action needs to be performed. For example, if the <If> part of the rule evaluates to false, then an action does not need to be performed and database 106 does not need to be queried for the more details of the rule. However, if the <If> part evaluates to True, then the action can be performed if it has been encoded (as in the case of rule #2). For rule #1, the action was not encoded and database 106 can be queried for more details for the applicable rule. Details for the rule, such as the action to perform, may be retrieved.

Many events occur as a user is using the form. Conventionally this would have caused many database queries to determine if a rule existed for the event. However, by loading a condensed version of the rule into cache 116, a quick determination can be made to determine if a rule applies to the event and for an action to be performed without querying database 106. Also, loading the condensed version into cache allows more information to be loaded into a smaller storage space than database 106. Cache 116 may have limited storage space and thus loading the condensed version allows for more rule segments to be loaded than if all the details for the rules were loaded into cache (i.e., if the full rule was loaded into cache 116, a smaller number of rules would be loaded because of the limited storage space). For many of the events that occur, an action of a rule may not be applicable. By storing a condensed version of the rules, unnecessary queries are avoiding thereby saving computing and networking resources.

Figure 3:
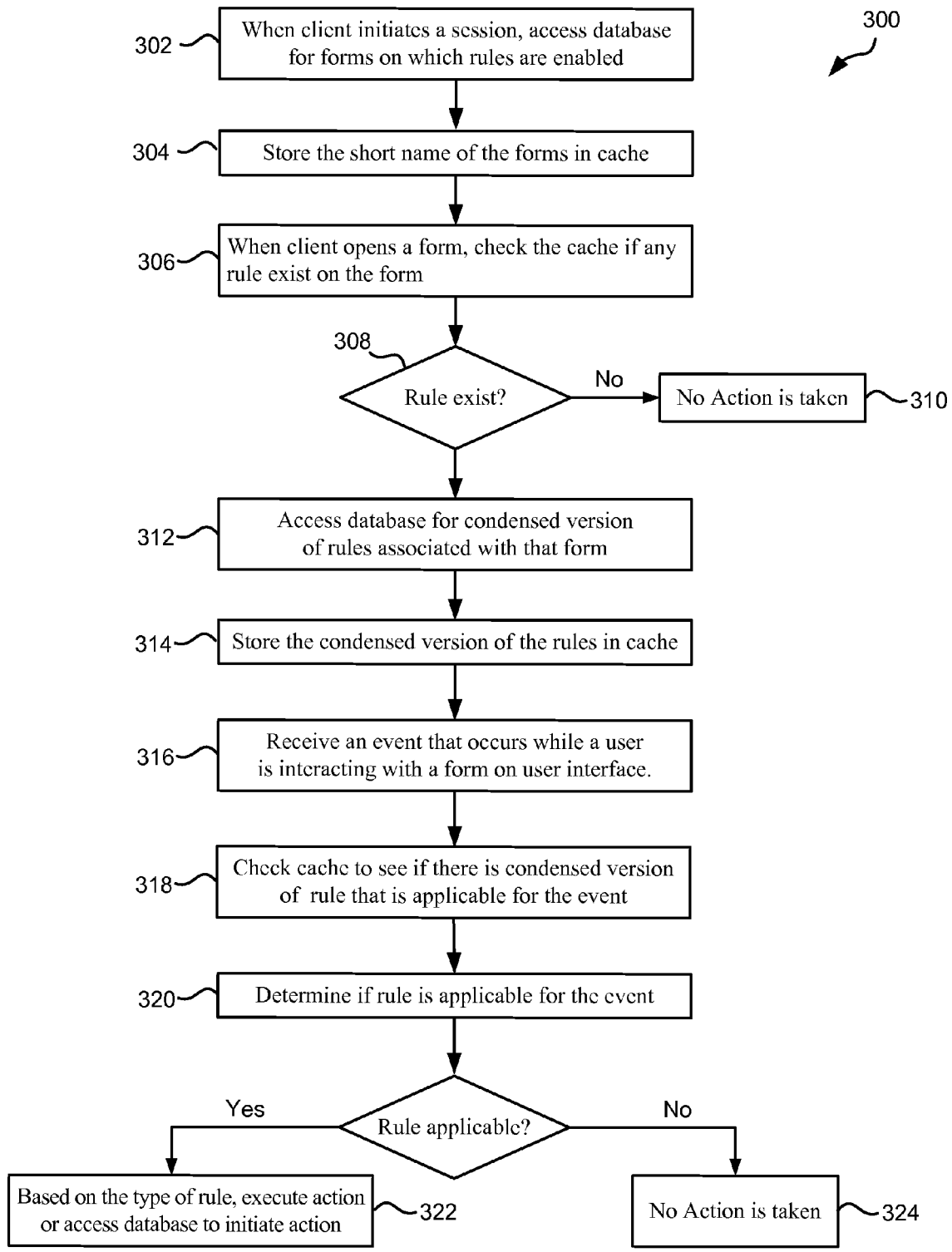
FIG. 3 depicts a simplified flowchart of a method for caching rules according to one embodiment.

A method of caching will now be described. FIG. 3 depicts a simplified flowchart of a method for caching rules according to one embodiment. The method may be performed by rules engine 112. Instructions for the method may be stored in a computer-readable storage medium and executed by a computer processor.

In step 302, when client 108 initiates a session, rules engine 112 accesses database 106 for forms on which rules are enabled. In step 304, rules engine 112 stores the short name for the forms in cache 116.

In step 306, when client opens a form, rules engine 116 checks cache 116 to determine if any rule exists on the form. For example, when a session for the business product application is started or initiated, a short name of the forms for the application may be accessed. The short name may be an identifier for the form such as a global variable. When a form is opened, the short name is used to access the condensed version of rules for the opened form. Rules engine 116 determines if rules exists for the form in step 308. If a rule does not exist, in step 310, no action is taken.

If rules exist, in step 312, rules engine 112 accesses database 106 for a condensed version of rules associated with that form. In one embodiment, the rules are stored as an encoded string in database 106. The condensed version is retrieved from the encoded string.

In step 314, rules engine 112 stores the condensed version of the rules in cache 116. The condensed version may be stored in one or more cache tables and may include the conditional part for the rules. The detailed version of the rules is stored in database 106 and may be stored in multiple tables.

In step 316, rules engine 112 receives an event that occurs while a user is interacting with a form on user interface 118.

In step 318, rules engine 112 checks cache 116 to see if there is a condensed version of the rule that is applicable for the event. For example, the event may have been associated with an item and a rule for that item is retrieved.

In step 320, it is determined if a rule is applicable for the event. For example, the conditional part may be evaluated against the event. If not, no action is taken (i.e., database 106 is not queried for the rule). If the rule is applicable, in step 322, rules engine 112 executes the action if it has been encoded in the condensed version or accesses the rule from database 106. For example, the condensed version is used to retrieve the rule from database 106. If the rule is not applicable, in step 324, rules engine 112 does not perform any action.

Figure 4:
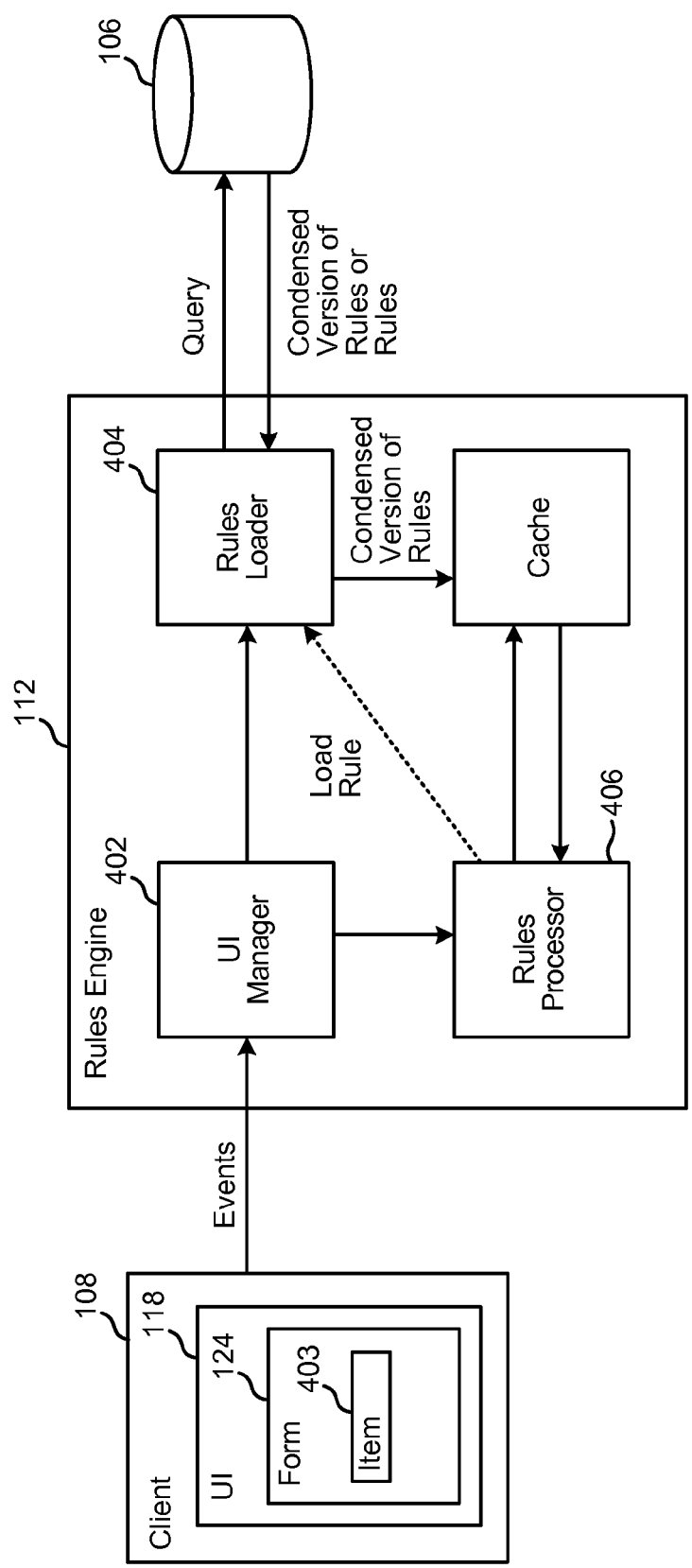
FIG. 4 depicts a more detailed embodiment of a rules engine according to one embodiment.

FIG. 4 depicts a more detailed embodiment of rules engine 112 for rules caching according to one embodiment. Rules engine 112 includes a user interface (UI) manager 402, a rules loader 404, and a rules processor 406.

UI manager 402 is configured to interact with user interface 118. UI manager 402 receives events that are associated with forms 124 being accessed on UI 118. For example, when an event occurs for an item 408, an event is sent to UI manager 402. UI manager 402 also manages when forms are accessed or a session is started. For example, when a session is started or a new form is loaded, an indication may be sent to rules loader 404. This may trigger a loading of a condensed version of rules. For example, rules 404 may use a global variable associated with a form to access the condensed version of rules that are associated with the form. Once the condensed version of rules is accessed, they are stored in cache 116.

When an event is received, it is forwarded to rules processor 406. Rules processor 406 can determine what actions should be taken, such as determining that an action for the rule is not applicable or determining that a query to the database should be made. Rules processor 406 may access cache 116 to determine if there is a rule associated with the event, such as a rule associated with item 408 with the event. If there is a rule, rules processor 406 evaluates the rule to see if it is applicable. If soothe rule is applicable and an action needs to be loaded, rules processor 406 sends a message to rules loader 404 to load a more detailed version of the rule from database 106. Rules loader 404 may load the rule from database 106 using a database query. When the rule is received, UI manager 402 may perform an action associated with the rule. UI manager 402 may perform the action when it is received from database 106.

If no rule is associated with the event, the database query is not performed and UI manager 402 may be notified that a rule is not associated with the event at 414. If the action part is found in the condensed version, then UI manager 402 may perform the rule.

Rule Creation

In addition to caching rules, rules may be created and activated dynamically. For example, a user may create a rule using interface 118 and have that rule be immediately effective without navigating to another screen, such as a rules configuration screen that may have been used to activate the rule.

Figure 5:
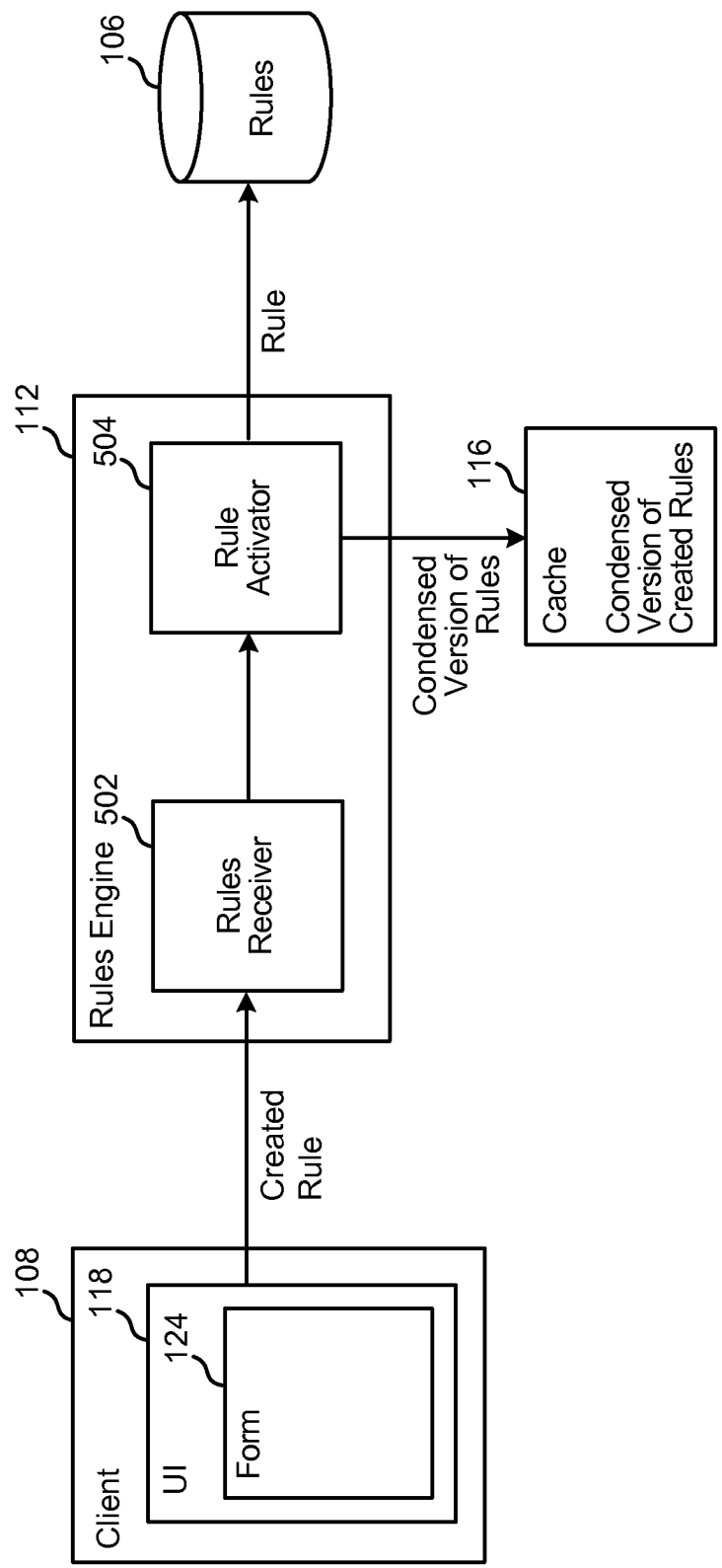
FIG. 5 depicts an example of a system for creating rules according to one embodiment.

FIG. 5 depicts an example of a system 100 for creating rules according to one embodiment. For example, rules engine 112 may include a rule receiver 502 and a rule activator 504. A user may be using form 124 in UI 118. For example, the user may be working with a form of the business application. The creation of rules is provided without having the user write any code for the application. In one example, the user may select a rule creation mode in a configuration screen. This may be an event tracking option that allows rules to be created. The user may then navigate to an item on a form to have a rule created for the item. For example, a user can navigate to a field for which a rule is to be created. A selection (e.g., a right click) on the field is received from the user. Rule receiver 502 can then output a set of rules that can be applied to the item. The user can then select a rule to apply from the list. The selection of a rule that a user wants to be applied to the item is received at rule receiver 502.

A rule activator 504 is then called to activate the rule immediately. For example, rule activator 504 includes a routine that is executed to automatically activate the rule. In one embodiment, a condensed version of the rule may be stored in cache 116. This allows rule engine 112 to use the condensed version of the rule as was discussed above. Also, a full version of the rule may be stored in database 106.

In one rules creation example, if the user chooses to hide a field, the field is immediately hidden as soon as the option to apply the rule is selected. No other action needs to be performed by the user. For example, navigation to another screen is not necessary to activate the rule, such as the user does not need to navigate to a rules configuration screen to activate the rule. This may provide many advantages. For example, the user saves time by not having to navigate to another form to activate the rule. Also, during any demonstration or sales cycle, the rules may be activated or demonstrated without having to navigate to other screens. This provides a much smoother demonstration as rules can be activated and shown seamlessly.

Figure 6:
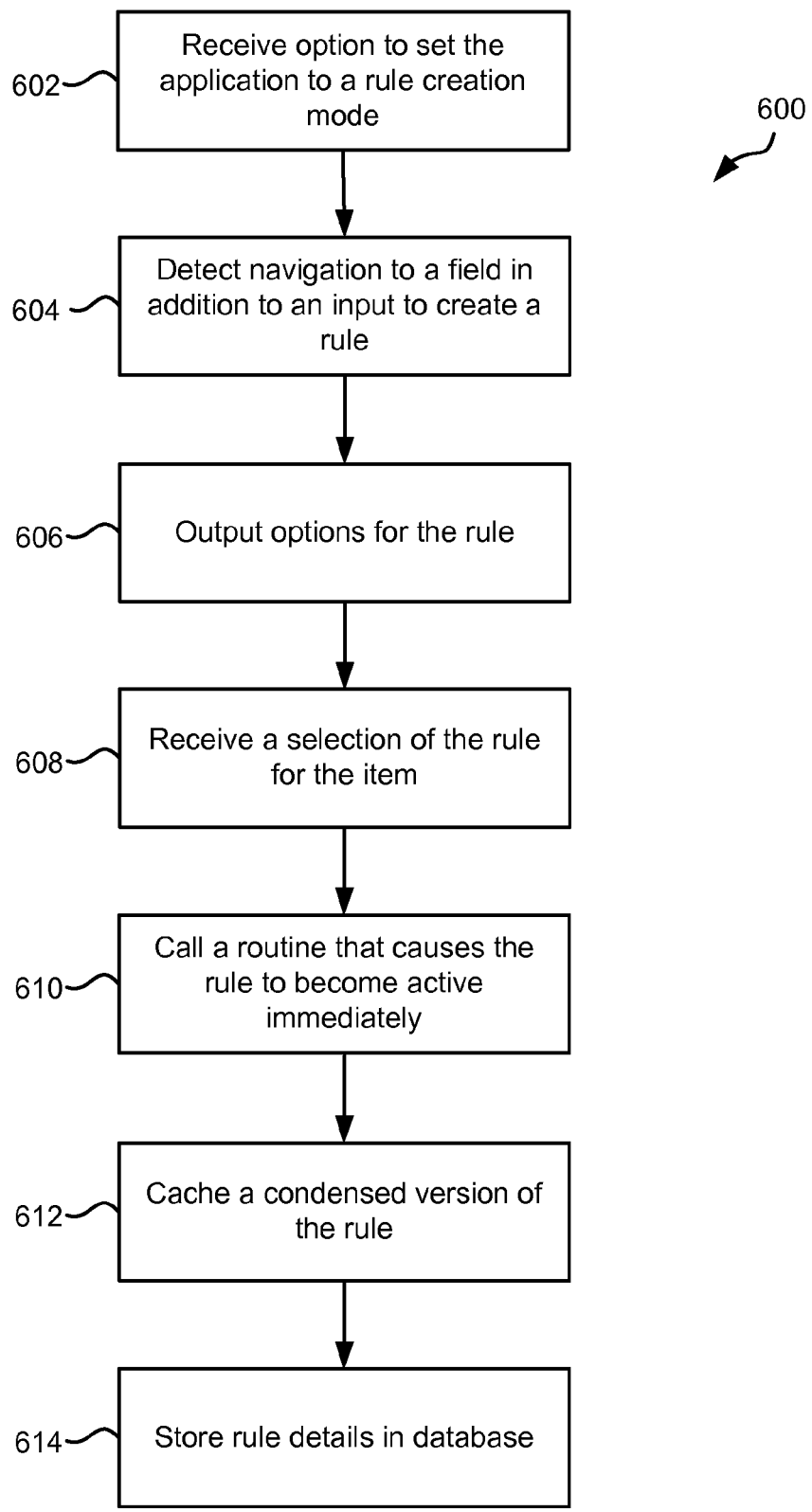
FIG. 6 depicts a simplified flowchart of a method for automatic creation of rules according to one embodiment.

FIG. 6 depicts a simplified flowchart 600 of a method for automatic creation of rules according to one embodiment. In step 602, an option to set the application to a rule creation mode is received. In step 604, navigation to a field is detected in addition to an input to create a rule. For example, a tab to a field or a selection of a field is detected.

In step 606, rules engine 112 outputs options for the rule. A user may review the rules and select the rule that the user wants to apply. In step 608, rules engine 112 receives the selection of the rule for the item.

In step 610, rules engine 112 calls a routine that causes the rule to become active immediately. For example, in step 612, a condensed version of the rule is cached and in step 614, the rule details are stored in database 106.

Figure 7A:
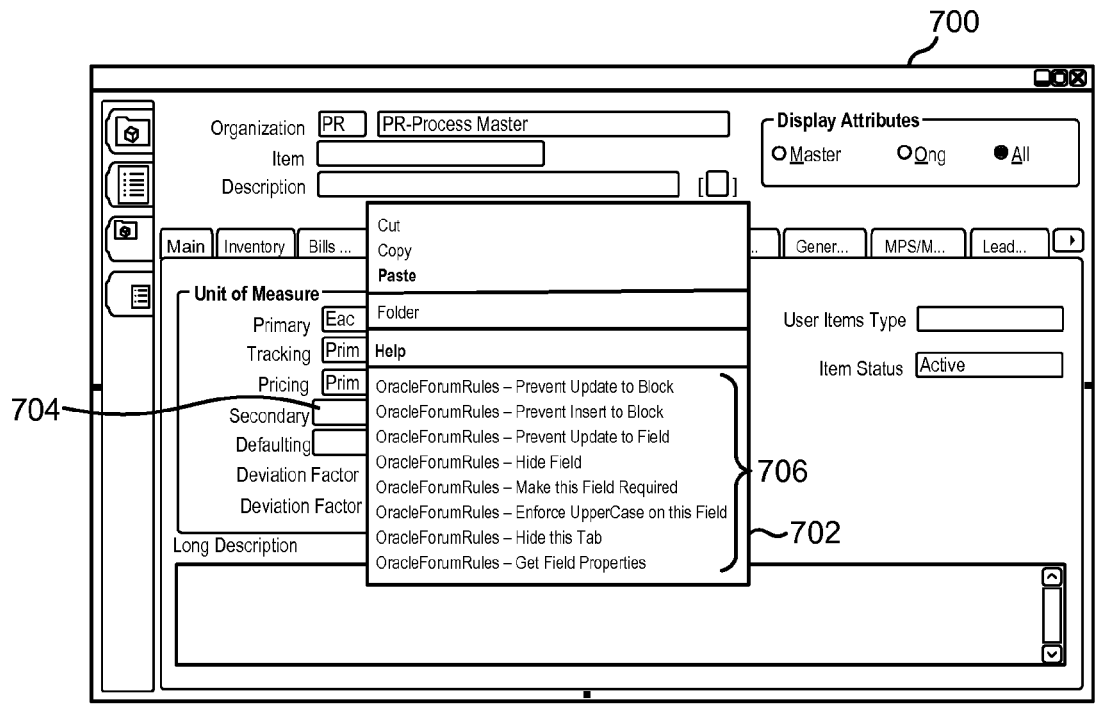
FIG. 7A shows a menu that is displayed when a user selects a field for creating a rule according to one embodiment.

The following shows interfaces that may be used to provide for automatic creation of the rules. FIG. 7A shows a menu 702 that is displayed (i.e., popped up) when a user selects a field 704 for creating a rule according to one embodiment. As shown, a plurality of rules are provided that can be configured for field 704. For example, the rules include preventing an update to the block, preventing insertion into the block, preventing an update to a field, hiding the field, making this field required, enforcing upper case on this field, hiding the tab, and getting field properties. These rules are associated with the GRC application. The user can select one of the rules in menu 702.

Figure 7B:
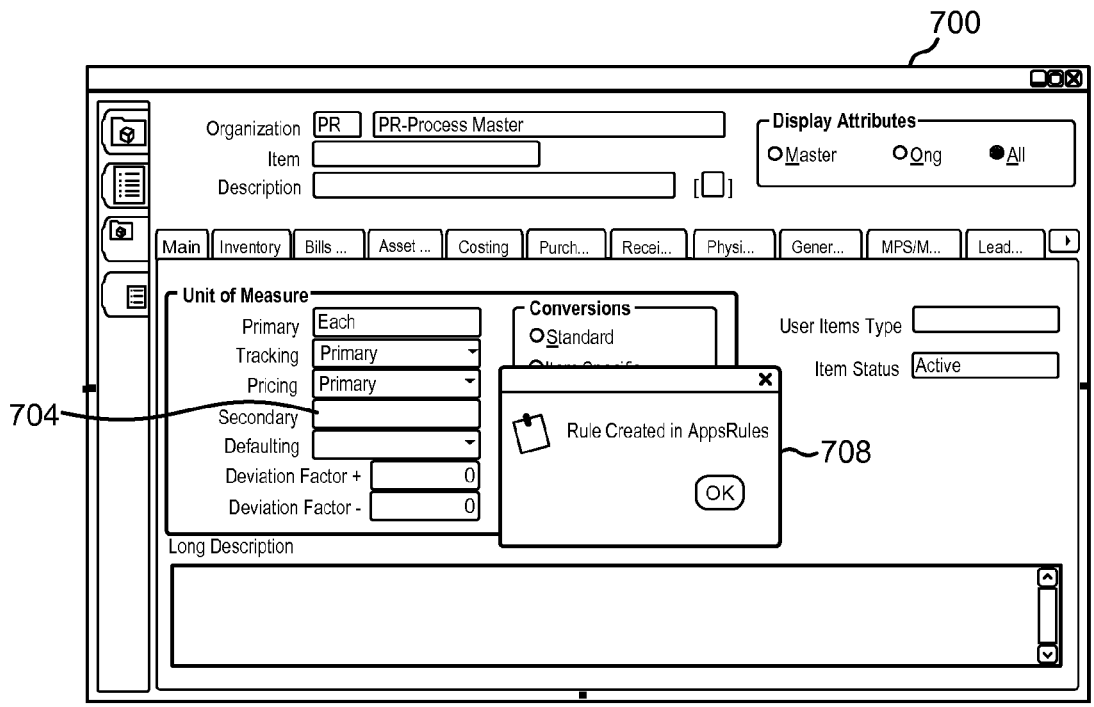
FIG. 7B shows an example of interface when the option is selected by the user according to one embodiment.

FIG. 7B shows an example of interface 700 when the option is selected by the user according to one embodiment. For example, a menu may be displayed that indicates that the rule has been created for field 704. Although menu 708 is shown, it will be understood that menu 708 does not need to be displayed. Rather, the rule may just be activated for field 704. If the user has selected hiding the field, field 704 is immediately hidden in interface 700.

Although the description has been described with respect to particular embodiments thereof, these particular embodiments are merely illustrative, and not restrictive. Although a GRC product is described, particular embodiments may be used with other applications.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:

determining whether rules exist for a form opened by a user, where the form provides an interface to an application running on a computer;

storing, in response to a determination that rules exist for the form opened by the user, a plurality of corresponding condensed versions of a plurality of full rules that exist for the form from a database into a cache, wherein each full rule includes a condition part and an action part, wherein at least one condensed version of a full rule in the cache includes only a condition part of the corresponding full rule and no action part;

identifying, using the computer, a condensed version of a corresponding full rule triggered by an event that occurs while the user is using the form;

evaluating, by the computer in response to the event occurring, the identified condensed version of the corresponding full rule to determine whether the action part of the corresponding full rule is included in the identified condensed version of the corresponding full rule, and to evaluate the condition part of the identified condensed version of the corresponding full rule to determine whether the action part of the corresponding full rule should be performed;

performing the action part of the corresponding full rule, using the computer, without querying the database in response to determining that the action part of the corresponding full rule should be performed and that the action part of the corresponding full rule is included in the identified condensed version of the corresponding full rule; and performing the action part of the corresponding full rule, using the computer, after querying the database to retrieve the action part of the corresponding full rule in response to determining that the action part of the corresponding full rule should be performed and that the action part of the corresponding full rule is not included in the identified condensed version of the corresponding full rule.

2. The method of claim 1, further comprising:

receiving an input to create a full rule pertaining to a form for an item on the form;

creating the full rule for the item; and automatically making the full rule active for the form upon receiving the input to create the rule.

3. The method of claim 2, wherein automatically making the full rule active comprises making the full rule active without navigation to a second form different from the form.

4. The method of claim 2, further comprising storing a condensed version of the full rule in the cache memory or storing the full rule in the database.

5. The method of claim 1, further comprising:

determining an initiation of a session;

loading short names for a plurality of forms for the session;

determining when the one or more forms are opened; and using one or more short names for the one or more forms to retrieve the condensed version of the plurality of full rules from the database.

6. A non-transitory computer-readable storage medium comprising encoded logic for execution by the one or more computer processors, the logic when executed is operable for performing the following steps:

determining whether rules exist for a form opened by a user, where the form provides an interface to an application running on a computer;

storing, in response to a determination that rules exist for the form opened by the user, a plurality of corresponding condensed versions of a plurality of full rules that exist for the form from a database into a cache, wherein each full rule includes a condition part and an action part, wherein at least one condensed version of a full rule in the cache includes only a condition part of the corresponding full rule and no action part;

identifying, using the computer, a condensed version of a corresponding full rule triggered by an event that occurs while the user is using the form;

evaluating, by the computer in response to the event occurring, the identified condensed version of the corresponding full rule to determine whether the action part of the corresponding full rule is included in the identified condensed version of the corresponding full rule, and to evaluate the condition part of the identified condensed version of the corresponding full rule to determine whether the action part of the corresponding full rule should be performed;

performing the action part of the corresponding full rule, using the computer, without querying the database if in response to determining that the action part of the corresponding full rule should be performed and that the action part of the corresponding full rule is included in the identified condensed version of the corresponding full rule; and performing the action part of the corresponding full rule, using the computer, after querying the database to retrieve the action part of the corresponding full rule in response to determining that the action part of the corresponding full rule should be performed and that the action part of the corresponding full rule is not included in the identified condensed version of the corresponding full rule.

7. The computer-readable storage medium of claim 6, wherein the logic is further operable to:

receive an input to create a full rule pertaining to a form for an item on the form;

create the full rule for the item; and automatically make the full rule active for the form upon receiving the input to create the rule.

8. The computer-readable storage medium of claim 6, wherein the event comprises an interaction performed on an item in the form, wherein the condensed version of the full rule is determined for the item from the cache memory.

9. The computer-readable storage medium of claim 6, wherein the logic when executed is further operable to:

determine an initiation of a session;

load short names for a plurality of forms for the session;

determine when the one or more forms are opened; and use one or more short names for the one or more forms to retrieve the condensed version of the plurality of full rules from the database.

10. An apparatus comprising:

one or more computer processors; and logic encoded in one or more computer-readable storage media for execution by the one or more computer processors and when executed operable for performing the following steps:

determining whether rules exist for a form opened by a user, where the form provides an interface to an application running on a computer;

storing, in response to a determination that rules exist for the form opened by the user, a plurality of corresponding condensed versions of a plurality of full rules that exist for the form from a database into a cache, wherein each full rule includes a condition part and an action part, wherein at least one condensed version of a full rule in the cache includes only a condition part of the corresponding full rule and no action part;

identifying, using the computer, a condensed version of a corresponding full rule triggered by an event that occurs while the user is using the form;

evaluating, by the computer in response to the event occurring, the identified condensed version of the corresponding full rule to determine whether the action part of the corresponding full rule is included in the identified condensed version of the corresponding full rule, and to evaluate the condition part of the identified condensed version of the corresponding full rule to determine whether the action part of the corresponding full rule should be performed;

performing the action part of the corresponding full rule, using the computer, without querying the database in response to determining that the action part of the corresponding full rule should be performed and that the action part of the corresponding full rule is included in the identified condensed version of the corresponding full rule; and performing the action part of the corresponding full rule, using the computer, after querying the database to retrieve the action part of the corresponding full rule in response to determining that the action part of the corresponding full rule should be performed and that the action part of the corresponding full rule is not included in the identified condensed version of the corresponding full rule.

\* \* \* \* \*

UNITED STATES PATENT AND TRADEMARK OFFICE
CERTIFICATE OF CORRECTION

PATENT NO. : 8,473,508 B2　　　　　　　　　　　　　　　　　　　　　　　　Page 1 of 1
APPLICATION NO. : 12/572044
DATED : June 25, 2013
INVENTOR(S) : Padala et al.

It is certified that error appears in the above-identified patent and that said Letters Patent is hereby corrected as shown below:

In the Drawings:

On sheet 2 of 9, in figure 2A, under reference numeral 106, line 3, delete "Respository" and insert -- Repository --, therefor.

On sheet 4 of 9, in figure 2C, line 9, delete "Seqment" and insert -- Segment --, therefor.

In the Claims:

In column 10, line 26, in Claim 6, delete "database if in" and insert -- database in --, therefor.

Signed and Sealed this
Twenty-second Day of October, 2013

Teresa Stanek Rea
*Deputy Director of the United States Patent and Trademark Office*